United States Patent
Bhavnani

(10) Patent No.: US 7,384,182 B2
(45) Date of Patent: Jun. 10, 2008

(54) AUTOMATIC STIRRING TRAVEL BEVERAGE CONTAINER

(75) Inventor: Dilip Bhavnani, Beverly Hills, CA (US)

(73) Assignee: Sun Coast Merchandise Corporation, Commerce, CA (US)

( * ) Notice: Subject to any disclaimer, the term of this patent is extended or adjusted under 35 U.S.C. 154(b) by 195 days.

(21) Appl. No.: 11/012,539

(22) Filed: Dec. 14, 2004

(65) Prior Publication Data

US 2006/0126431 A1 Jun. 15, 2006

(51) Int. Cl.
*A47J 43/046* (2006.01)

(52) U.S. Cl. .................................. 366/130; 366/314

(58) Field of Classification Search ............. 366/130, 366/237–238, 243, 276–278, 314; 215/DIG. 7, 215/DIG. 8; 220/568; 99/348
See application file for complete search history.

(56) References Cited

U.S. PATENT DOCUMENTS

| | | | | | |
|---|---|---|---|---|---|
| 3,677,524 | A | * | 7/1972 | Douglas | 366/130 |
| 4,435,084 | A | * | 3/1984 | Calhoun et al. | 366/130 |
| 4,887,909 | A | * | 12/1989 | Bennett | 366/199 |
| 4,967,939 | A | * | 11/1990 | Taylor | 222/196 |
| 5,249,703 | A | | 10/1993 | Karp | |
| 5,360,176 | A | * | 11/1994 | Mugge et al. | 241/282.1 |
| 5,425,579 | A | * | 6/1995 | Sampson | 366/130 |
| 5,447,245 | A | * | 9/1995 | Merhar | 215/6 |
| 5,639,161 | A | * | 6/1997 | Sirianni | 366/314 |
| 5,720,552 | A | * | 2/1998 | Schindlegger | 366/197 |
| 5,911,504 | A | * | 6/1999 | Schindlegger, Jr. | 366/197 |
| 5,918,761 | A | | 7/1999 | Wissenger | |
| 5,961,004 | A | * | 10/1999 | DeMars | 222/205 |
| 6,200,015 | B1 | * | 3/2001 | Gartz et al. | 366/256 |
| 6,231,226 | B1 | * | 5/2001 | Neidigh | 366/256 |
| 6,264,359 | B1 | * | 7/2001 | Buss et al. | 366/220 |
| 6,390,665 | B1 | * | 5/2002 | Silveria | 366/307 |
| 6,471,085 | B1 | * | 10/2002 | Gallo | 220/501 |
| 6,471,390 | B1 | * | 10/2002 | Cuthbertson et al. | 366/101 |
| 6,719,451 | B1 | * | 4/2004 | Yue | 366/130 |
| 6,796,705 | B1 | * | 9/2004 | Khubani | 366/197 |
| 6,962,432 | B2 | * | 11/2005 | Hofeldt | 366/118 |
| 2001/0036124 | A1 | * | 11/2001 | Rubenstein | 366/205 |
| 2003/0026164 | A1 | * | 2/2003 | Klein | 366/130 |
| 2003/0076735 | A1 | * | 4/2003 | Niland | 366/54 |
| 2005/0135186 | A1 | * | 6/2005 | Mbakop | 366/101 |
| 2005/0254341 | A1 | * | 11/2005 | Gerling et al. | 366/205 |
| 2006/0126431 | A1 | * | 6/2006 | Bhavnani | 366/314 |
| 2006/0193200 | A1 | * | 8/2006 | Herbert | 366/314 |
| 2006/0198241 | A1 | * | 9/2006 | Krishnachaitanya et al. | 366/205 |
| 2007/0297281 | A1 | * | 12/2007 | Saunders et al. | 366/251 |
| 2008/0037360 | A1 | * | 2/2008 | McGill | 366/130 |

\* cited by examiner

*Primary Examiner*—Charles E Cooley
(74) *Attorney, Agent, or Firm*—The Soni Law Firm

(57) ABSTRACT

A hot or cold beverage container with an integral stirring device and two separated shells to form a hollow space between them for better insulation. The outer shell of the stirring container comprises contiguous upper and lower sidewalls demarcated by a neck wherein the lower sidewall can fit into the beverage container orifice located in the passenger compartment of most, if not all, motor vehicles. The beverage container also has a handle and a power switch located on the handle for operating the stirring device, and provides an excellent vehicle for advertising whereby graphical or advertising material may be imprinted on its surfaces.

9 Claims, 3 Drawing Sheets

AUTOMATIC STIRRING TRAVEL BEVERAGE CONTAINER

BACKGROUND OF THE INVENTION

The present invention relates to a hot or cold beverage container with an integral stirring device. More specifically, the present invention relates to the design of the stirring container being of a shape and size whereby it readily fits into the beverage container orifice located in the passenger compartment of most, if not all motor vehicles. The beverage container also provides an excellent advertising means as graphical or advertising material may be imprinted on its surfaces.

Insulated travel beverage mugs have existed for some time. These mugs are made in a generally cylindrical shape. More recently, a tapered cylindrical shape has been introduced such that the closed end of the container is of a reduced diameter in comparison to the open end. Examples of typical insulated mugs are disclosed in U.S. Pat. No. 5,249,703 to Karp and U.S. Pat. No. 5,918,761 to Wissinger. A problem with these containers is they have no means by which the liquid may be stirred while in the container so as to maintain a desired temperature and/or desired consistency of the liquid.

Stirring mechanisms mounted in the bases of beverage holders or cups have also been existence, such as those disclosed in U.S. Pat. No. 4,435,084 to Calhoun, U.S. Pat. No. 5,720,552 to Schindleggeer and U.S. patent application Ser. No. 2001/0036124A1 of Rubenstein. A problem with these mechanisms is that they are designed such that the diameter of the closed end of the cup in which the mechanism is located is of the same large diameter as the open end of the cup.

What is lacking in the prior art is an integral stirring mechanism comprised of components and a power supply of sufficiently small size such that the outside diameter of the container housing in which the stirring mechanism is located may be reduced to a smaller diameter than that of the open end of the container. With a reduced diameter closed end and a larger diameter open end, the beverage container is designed to maximize the volume of contained liquid while providing a closed end sized such that it will readily fit into the standard cup holder orifice in typical vehicle passenger compartments, some of which currently do not accommodate a beverage container of cylindrical shape having a large outside diameter.

SUMMARY OF THE INVENTION

The present invention overcomes the limitations of the prior art by presentation of a reduced diameter generally tapered shape insulated beverage container with an integral stirring mechanism. The user may thereby intermittently stir a liquid beverage while continuing to maintain the beverage temperature as closely as possible to the initial temperature of the beverage when introduced into the container vessel. In so doing, the temperature, homogeneousness and consistency of the beverage may be maintained by the user. The removable lid or cap of the container will include an opening of limited size through which the beverage may be withdrawn by the user. Additionally, the container vessel as designed will be most versatile as it may be successfully introduced into and thereafter retained within a standard size cup holder as presently utilized in a motor vehicle passenger compartment.

The principle object of the invention is to provide a universally sized container and lid which permits the user to stir the encapsulated beverage in a portable manner.

A preferred embodiment of the invention is illustrated in the form of an insulated portable stirring beverage container with lid. The container includes an outer shell vessel and a tightly sealing cap or lid having a small orifice through which the user may drink. The outer shell vessel is formed with an inner shell nested within the outer shell with the inner and outer shells separated by a hollow section. The inner and outer shells are typically welded or otherwise joined such that the hollow separation area is sealed from atmosphere. The space between the inner shell and outer shell may be evacuated during the manufacture to improve the capacity of the container to maintain the temperature of its content by utilization of a vacuum insulation chamber in the space between the inner and outer shells.

As the container is fabricated from distinct inner and outer shells, the components used therein may consist of different materials for the inner and outer shell. This process facilitates the use of particular dissimilar materials such as steel and plastic, which presents the opportunity for various aesthetically pleasing configurations, such as an embodiment with a metallic outer shell and a durable polymer inner shell. Additionally, the outer surface of the container is designed to readily accept marketing or other identifying copy or graphics while the remaining components of the invention, including the inner shell and the lid could be commonly manufactured.

In the preferred embodiment, an elastometric material is formed into a single seal ring surface in the lid whereby its sealing surface seals the interface of the container and the lid mounting assembly surface. Said elastometric seal ring if fitted into a circumferential groove in the outside mounting surface of the lid, thereby imparting a tightly sealing surface between the seal ring and the container lid.

A further objective of the invention is to provide a secure vessel for portability of hot or cold beverages. In a preferred embodiment, the single seal ring provides a tight seal between the container vessel and lid whereby when the lid is securely attached to the container vessel, the primary leakage path of liquid from the vessel is through the small orifice in the lid, permitting the user to tip the container so as to drink the liquid without leakage occurring between the container and lid surfaces.

In a preferred embodiment, a handle is disposed on the body of container assembly, located so as to project from the side of the container near the top.

In yet another preferred embodiment, the stirring mechanism is integral to the interior of the container. A stirring impeller having at least one blade is located at the base of the interior of the container. The impeller is driven by a shaft emanating from a motor located in an housing immediately below the interior surface of the inner shell. A power source energizes the impeller motor to provide rotation to the shaft and thereby rotate the impeller. Preferably, the power source is a battery. A switch is located on a portion of the container, preferably on the handle, such that the user may engage the switch by means of finger or thumb while holding the container in a comfortable position. Engagement of the switch closes an electrical circuit which imparts energy to the impeller causing it to rotate.

The present invention also satisfies the need for an improved beverage container to serve as an advertising or commercial device, having the advantages of less imprint distortion, greater imprint surface area and more discrete surfaces on which to imprint when compared to conventional beverage containers.

Other objects and advantages will become apparent from the following specification taken in connection with the accompanying drawings.

DETAILED DESCRIPTION OF THE INVENTION

Figure 1:
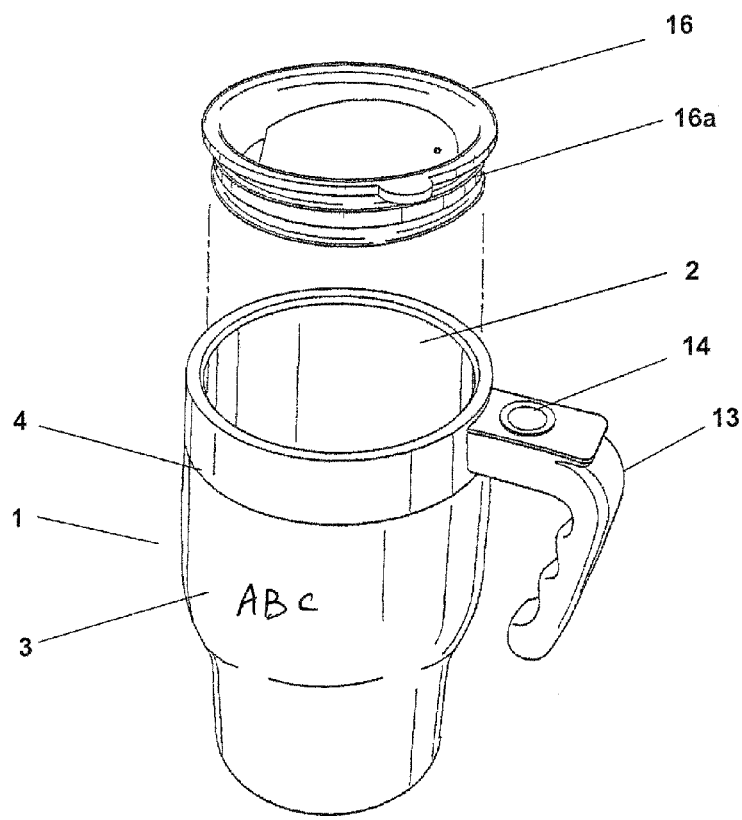
FIG. 1 is a top front perspective view of a preferred embodiment of an Automatic Stirring Travel Beverage Container with an optional lid.
Figure 3:
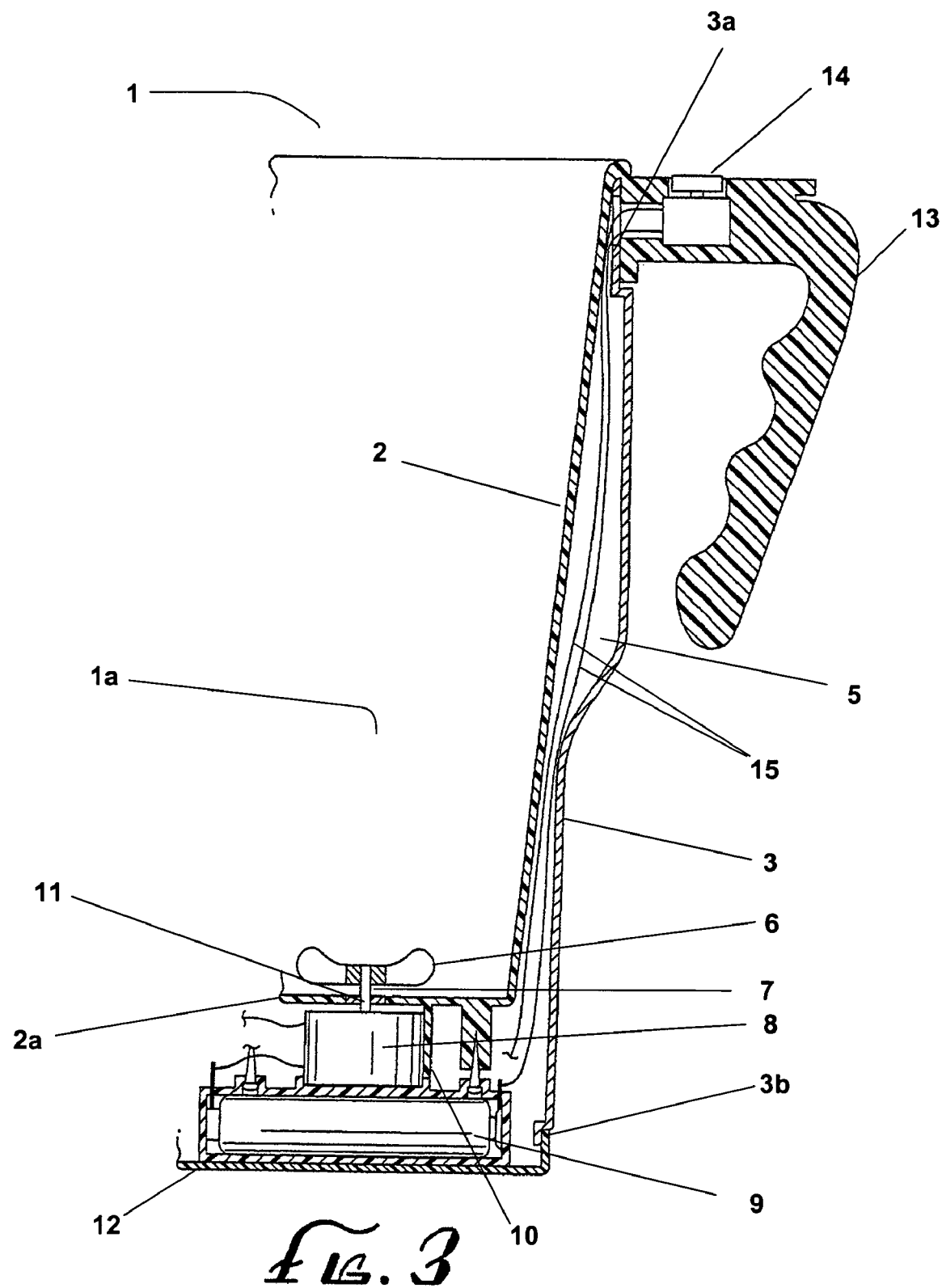
FIG. 3 is a side cross sectional view of a preferred embodiment of an Automatic Stirring Travel Beverage Container which shows the construction of the container as well as the stirring mechanism.

Referring to FIG. 1 and 3, an Automatic Stirring Travel Beverage Container (1) comprises an inner shell (2) radially displaced inside an outer shell (3). The outer shell (3), having generally curved cylindrical shape, has a top open end (3a) and a bottom open end (3b) and an outer sidewall extending between them, whereby the outside diameter of the bottom open end (3b) is less than that of the top open end (3a). The outer sidewall has two contiguous portions, an upper sidewall and a lower sidewall. The lower sidewall is continuously and inwardly tapered toward the bottom of the container and terminates thereat. This tapered shape of the lower sidewall maximizes the amount of liquid volume of the container. Preferably, the lower sidewall is sized to fit securably in an automobile beverage container holder of a given size. In the preferred embodiment, the lower side wall is dimensioned so as to permit the insertion of the container into an automobile cup holder having an opening of 2½ inches or greater diameter, which is generally accepted as a standard size for most, if not all automobiles. Further, as the outer sidewall extends from the upper to the lower sidewall the diameter of the outer sidewall decreases substantially sharply to form a neck proximate the junction of the upper and lower sidewalls.

These inner shell and outer shell are typically welded or otherwise permanently affixed to one another along a circumferential joining line (4), which creates an hollow space (5) between the inner shell (2) and outer shell (3). During the manufacture of an Automatic Stirring Travel Beverage Container (1), the hollow space (5) may be evacuated such that the heat insulative capability of the Automatic Stirring Travel Beverage Container (1) is improved.

Figure 2:
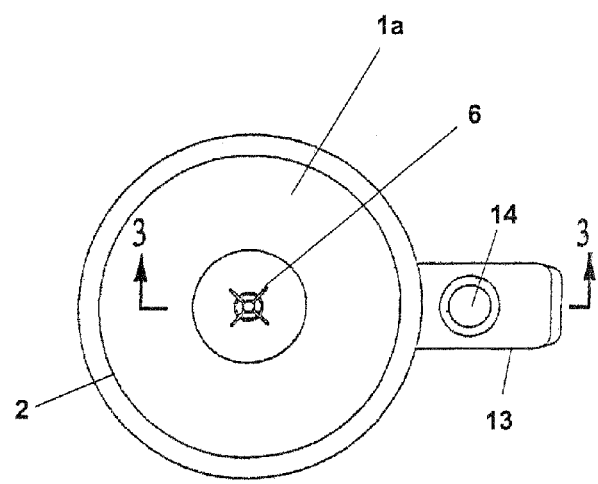
FIG. 2 is a top plan view of a preferred embodiment of an Automatic Stirring Travel Beverage Container showing the relative location of the stirring paddle.
Figure 7:
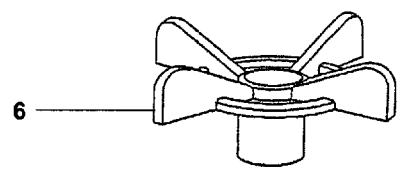
FIG. 7 is a bottom front perspective exploded view showing components of the stirring mechanism of a preferred embodiment of an Automatic Stirring Travel Beverage Container.

Referring to FIGS. 2, 3, and 7, the Automatic Stirring Travel Beverage Container (1) further comprises a stirring mechanism, which includes a blade paddle (6), impeller shaft (7), motor (8), power supply (9) and housing (10). The housing (10) for the mechanism may be integrally formed within the lower portion of the inner shell (2) and is located immediately below the closed end (2a) of the inner shell (2). The impeller (7) is introduced into the beverage vessel (1a) of the container (1) through a sealed orifice (11) in the closed end (2a) of the inner shell (2). The blade paddle (6) is affixed to the output end of the impeller shaft (7) such that the blade paddle (6) is located at the bottom of the vessel (1a) of the container. The input end of the impeller shaft (7) is affixed to a motor (8), which is in turn connected to a power supply (9) which energizes the motor (8) to then rotate the impeller shaft (7) and blade paddle (6).

Figure 4:
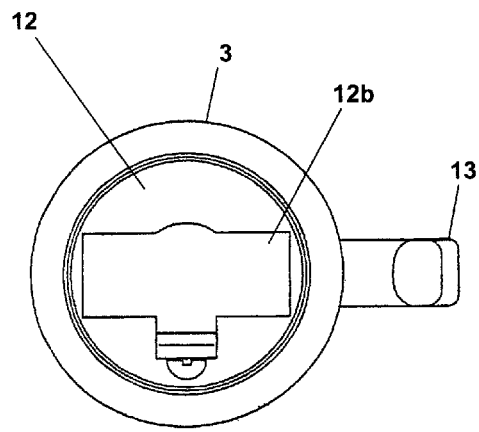
FIG. 4 is a bottom plan view of a preferred embodiment of an Automatic Stirring Travel Beverage Container showing the optional battery door location.
Figure 5:
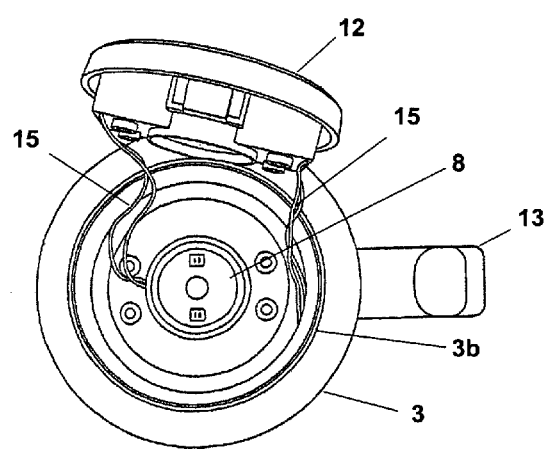
FIG. 5 is a bottom exploded view of an embodiment of a preferred embodiment of an Automatic Stirring Travel Beverage Container further depicting the stirring mechanism components.
Figure 6:
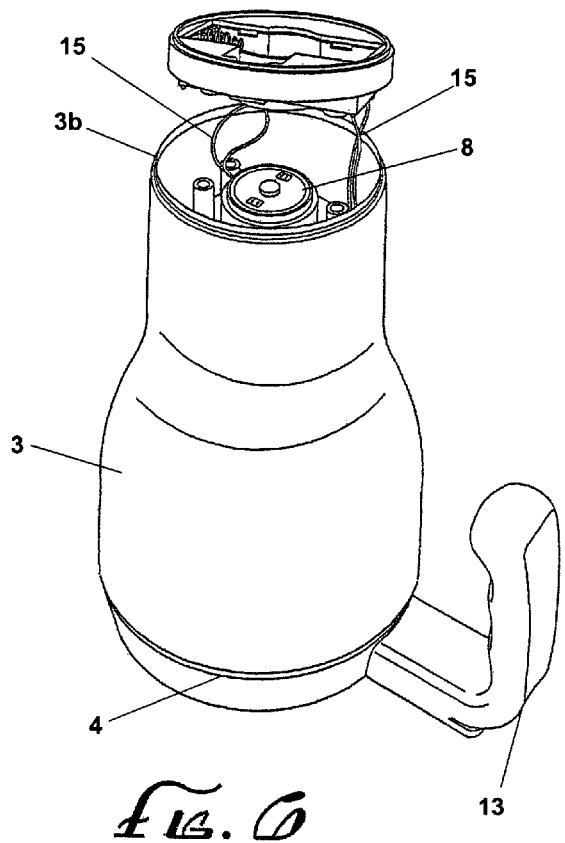
FIG. 6 is a bottom front perspective view of a preferred embodiment of an Automatic Stirring Travel Beverage Container.

As shown in FIGS. 5 and 6, the power supply (9) is housed within an end cap (12), which is affixed to the smaller diameter bottom open end (3b) of the outer shell (3). If a battery is used as the power supply (9), the preferred embodiment would further include a battery compartment and door (12b) as shown in FIG. 4, which would be configured based upon the size requirements of the particular battery selected. In another preferred embodiment, the invention could be configured so as to include a 12 volt power supply line, such that the user could use an auxiliary power supply from an automobile, such as a 12 volt cigarette lighter jack, as the power supply.

Referring again to FIG. 3, in the preferred embodiment of the container, a handle (13) is attached to the outer shell (3) proximate the top open end (3a). The handle (13) is preferably positioned between the top open end (3a) and the neck so as not to hinder the insertion of the lower sidewall into the automobile beverage container holder. Further, in the preferred embodiment, a switch (14) is located at the top of the handle (13). Circuit wiring (15) runs from the power supply (9) and motor (8) through the handle (13) to the switch (14), whereby pressing the switch (14) on the handle (13) closes the circuit to energize the motor (8) and commence rotation of the impeller shaft (7) and blade paddle (6).

Referring again to FIG. 1, another preferred embodiment f the container (1) further includes a lid (16) having a sealing surface (16a) and a small orifice from which the user may consume an encapsulated beverage from the beverage vessel.

The inner and outer shells my be manufactured from a variety of metallic or polymer types of material. In fact, a typical embodiment would include a polymer molded inner shell with a metallic outer shell for aesthetic appeal. The handle and lid would typically be manufactured of a molded polymer, however, the invention is not limited to these materials.

The preferred embodiment may also serve as an advertising or commercial device as it would present an excellent surface for the imprinting of advertising or graphical materials for the purposes of advertising or promotion.

What is claimed is:

1. A beverage container for use with an automobile beverage container holder, the container comprising:
   (a) an outer shell having a generally curved cylindrical shape, the outer shell having a closed outer-shell end forming a bottom of the container, an opposing open outer-shell end and an outer sidewall extending therebetween, the open outer-shell end having a larger diameter than the closed outer-shell end, the outer sidewall comprising an upper sidewall and a contiguous lower sidewall, the lower sidewall being continuously and inwardly tapered to terminate at the bottom of the container, the lower sidewall being sized and configured to fit securely in the automobile beverage container holder, the outer sidewall having a substantially sharp decrease in diameter as traversed from the upper sidewall to the lower sidewall so as to form a neck proximate a junction of the upper and lower sidewalls, the neck being sized and configured to obstruct the upper sidewall from being inserted into the automobile beverage container holder;

(b) an inner shell having an open inner-shell end and an opposing closed inner-shell end defining an inner sidewall therebetween for holding liquid therewith, the inner shell being sized and configured to be received within the outer shell spaced-apart therefrom to form a hollow inter-shell space between the inner and outer sidewalls;

(c) a handle connected, at an end thereof, to the container proximate the open outer-shell end, the handle being positioned between the open outer-shell end and the neck so as to allow insertion of the lower sidewall of the outer shell into the automobile beverage container holder; and (d) a stirring mechanism comprising at least one blade paddle disposed within the inner shell proximate the closed inner-shell end, an impeller shaft connected to the blade paddle and configured to rotate about the central axis of the inner shell, a motor for rotating the impeller shaft, a power source to energize the motor, an electric circuit, and a switch electrically connected to the motor and the power source for selectively transmitting power from the power source to the motor, the switch being located on the handle so as to be accessible by a user while the lower sidewall of the outer shell remains inserted in the automobile beverage container holder.

2. The beverage container of claim 1 wherein the power source comprises at least one battery.

3. The beverage container of claim 1, further including a lid with a drinking orifice and configured to removably seal the open inner-shell end to prevent leakage of the liquid other than through the drinking orifice.

4. The beverage container of claim 1, further including advertising material disposed on at least one surface of the container.

5. The beverage container of claim 1, wherein the switch is electrically connected to the electric circuit via electric wires that pass through the hollow space between the outer and inner shells.

6. The beverage container of claim 1, wherein the inter-shell space between the outer and inner shells defines an evacuated space for insulation.

7. The beverage container of claim 1, wherein the motor, the power source, and the electric circuit are located in the space formed between the closed ends of the outer and inner shells.

8. The beverage container of claim 1, wherein the handle has a shape of a generally inverted L having a substantially horizontal portion and a hand-gripping portion.

9. A method of advertising comprising the steps of:

(a) providing a beverage container for use with an automobile beverage container holder, the container comprising:

(1) an outer shell having a generally curved cylindrical shape, the outer shell having a closed outer-shell end forming a bottom of the container and an opposing open outer-shell end and an outer sidewall extending therebetween, the open outer-shell end having a larger diameter than the closed outer-shell end, the outer sidewall comprising an upper sidewall and a contiguous lower sidewall, the lower sidewall being continuously and inwardly tapered to terminate at the bottom of the container, the lower sidewall being sized and configured to fit securely in the automobile beverage container holder, the outer sidewall having a substantially sharp decrease in diameter as traversed from the upper sidewall to the lower sidewall so as to form a neck proximate a junction of the upper and lower sidewalls, the neck being sized and configured to obstruct the upper sidewall from being inserted into the automobile beverage container holder;

(2) an inner shell having an open inner-shell end and an opposing closed inner-shell end defining an inner sidewall therebetween for holding liquid therewith, the inner shell being sized and configured to be received within the outer shell and spaced-apart therefrom to form a hollow inter-shell space between the inner and outer sidewalls, (3) a handle connected, at an end thereof, to the container proximate the open outer-shell end, the handle being positioned between the open outer-shell end and the neck so as to allow insertion of the lower sidewall of the outer shell into the automobile beverage container holder, and (4) a stirring mechanism comprising at least one blade paddle disposed within the inner shell proximate the closed inner-shell end, an impeller shaft connected to the blade paddle and configured to rotate about the central axis of the inner shell, a motor for rotating the impeller shaft, a power source to energize the motor, an electric circuit, and a switch electrically connected to the motor and the power source for selectively transmitting power from the power source to the motor, the switch being located on the handle so as to be accessible by a user while the lower sidewall of the outer shell remains inserted in the automobile beverage container holder; and (b) disposing advertising material on a visible outer surface of the container.

* * * * *